US009948168B2

(12) United States Patent
Kawamoto et al.

(10) Patent No.: US 9,948,168 B2
(45) Date of Patent: Apr. 17, 2018

(54) MANUFACTURING METHOD OF A STATOR

(71) Applicant: AISIN AW CO., LTD., Anjo-shi, Aichi-ken (JP)

(72) Inventors: Mutsumi Kawamoto, Nagoya (JP); Susumu Kato, Anjo (JP); Shingo Hashimoto, Okazaki (JP); Takeshi Yokoyama, Anjo (JP); Hiroyuki Tanaka, Anjo (JP); Kazuya Iwatsuki, Takahama (JP); Shingo Sato, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 222 days.

(21) Appl. No.: 14/765,148

(22) PCT Filed: Feb. 20, 2014

(86) PCT No.: PCT/JP2014/053962
§ 371 (c)(1),
(2) Date: Jul. 31, 2015

(87) PCT Pub. No.: WO2014/129521
PCT Pub. Date: Aug. 28, 2014

(65) Prior Publication Data
US 2015/0381021 A1 Dec. 31, 2015

(30) Foreign Application Priority Data

Feb. 21, 2013 (JP) ................. 2013-032409

(51) Int. Cl.
*H02K 15/00* (2006.01)
*H02K 15/06* (2006.01)
*H02K 3/52* (2006.01)

(52) U.S. Cl.
CPC .......... *H02K 15/066* (2013.01); *H02K 3/522* (2013.01); *H02K 15/0075* (2013.01); *H02K 2203/06* (2013.01); *Y10T 29/49009* (2015.01)

(58) Field of Classification Search
CPC ........ H02K 3/28; H02K 1/16; H02K 15/0056; H02K 15/00; Y10T 29/49009;
(Continued)

(56) References Cited

U.S. PATENT DOCUMENTS 8,766,497 B2 * 7/2014 Goto ..................... H02K 3/24
310/53
2005/0108870 A1 5/2005 Harada et al.
(Continued)

FOREIGN PATENT DOCUMENTS

CN          101222155 A    7/2008
JP          2005-151668 A  6/2005
(Continued)

*Primary Examiner* — Thiem Phan
(74) *Attorney, Agent, or Firm* — Oliff PLC

(57) ABSTRACT

A manufacturing method of a stator for manufacturing a stator by mounting a concentrated winding coil wound with a square wire conductor on each of a plurality of teeth in a stator core and welding end of the concentrated winding coil to corresponding end of another concentrated winding coil, characterized in that a first set of concentrated winding coils and a second set of concentrated winding coils are mounted on the teeth, and the welding of each end in the first set of concentrated winding coils and corresponding end in the second set of concentrated winding coils is started while a third set of concentrated winding coils is mounted on the teeth.

8 Claims, 9 Drawing Sheets

(58) Field of Classification Search
CPC ......... Y10T 29/49073; Y10T 29/49071; Y10T 29/49012; Y10T 29/53143
USPC .......................... 29/596, 598, 605, 606, 732
See application file for complete search history.

(56) References Cited

U.S. PATENT DOCUMENTS

| | | |
|---|---|---|
| 2008/0174199 A1 | 7/2008 | Ishigami et al. |
| 2009/0200888 A1* | 8/2009 | Tanaka ..................... H02K 3/12 310/195 |
| 2010/0066198 A1 | 3/2010 | Fubuki et al. |

FOREIGN PATENT DOCUMENTS

| | | |
|---|---|---|
| JP | 2005-160143 A | 6/2005 |
| JP | 2008-220093 A | 9/2008 |
| JP | 2010-104232 A | 5/2010 |
| JP | 2010-110122 A | 5/2010 |

* cited by examiner

MANUFACTURING METHOD OF A STATOR

Exemplary embodiments relate to a manufacturing method and a manufacturing device of a stator in which concentrated winding coils are mounted on a plurality of teeth in a stator core.

BACKGROUND

When manufacturing a stator of a rotary electric machine using a rectangular wire, and the like, a coil is placed in each of a plurality of slots in a stator core or a coil is mounted on each of a plurality of teeth in the stator core, and ends of the coils are welded to each other after all the coils are placed or mounted.

For example, in a rotary electric machine of Patent Document 1 and a motor stator of Patent Document 2, coils including rectangular wires are placed with respect to the stator core, and then ends of the rectangular wires of coils are joined through welding, and the like.

RELATED-ART DOCUMENTS

Patent Document

[Patent Document 1] Japanese Patent Application Publication No. 2010-110122 (JP 2010-110122 A)
[Patent Document 2] Japanese Patent Application Publication No. 2008-220093 (JP 2008-220093 A)

SUMMARY

If the welding is carried out after all the coils are placed in the stator core, however, an extra device needs to be prepared in a step of placing the coils and a step of carrying out the welding. The space occupied by the extra device in a factory thus increases.

In light of the above background, exemplary embodiments provide a manufacturing method and a manufacturing device of a stator capable of reducing the number of the devices to be used for manufacturing the stator and reducing the space occupied by such devices in the manufacturing steps of the stator.

According to one aspect of aan exemplary embodiment, a manufacturing method of a stator for manufacturing a stator by mounting a concentrated winding coil wound with a square wire conductor on each of a plurality of teeth in a stator core and welding end of the concentrated winding coil to corresponding end of another concentrated winding coil wherein a first set of concentrated winding coils and a second set of concentrated winding coils are mounted on the teeth, and the welding of each end in the first set of concentrated winding coils and corresponding end in the second set of concentrated winding coils is started while a third set of concentrated winding coils is mounted on the teeth.

According to another aspect of the an exemplary embodiment, a manufacturing device of a stator including a coil mounting means that sequentially mounts concentrated winding coils wound with a square wire conductor on a plurality of teeth in a stator core; and a welding means that welds end of the concentrated winding coil and corresponding end of another concentrated winding coil wherein the coil mounting means is mounting a third set of concentrated winding coils on the teeth, the welding means starts to weld each end in a first set of concentrated winding coils already mounted on the teeth and a corresponding end in a second set of concentrated winding coils already mounted on the teeth.

The manufacturing method of the stator is devised to carry out the mounting of the coils to the stator core and the welding of the ends of the coils in the same space when mounting the concentrated winding coils wound with the square wire conductor on the teeth of the stator core.

Specifically, the first set of concentrated winding coils, which is one set of concentrated winding coils, and the second set of concentrated winding coils, which is another set of concentrated winding coils, are mounted on the teeth of the stator core. Each end in the first set of concentrated winding coils and corresponding end in the second set of concentrated winding coils are welded while the third set of concentrated winding coils, which is the other set of concentrated winding coils, is mounted on the teeth.

Thus, the mounting and the welding of the concentrated winding coils can be carried out in the same step for manufacturing the stator, whereby the number of the devices used for manufacturing the stator can be reduced. Furthermore, the space occupied by the devices used for manufacturing the stator in the manufacturing step of the stator can be reduced.

In the manufacturing device of the stator, the similar operation effects to the effects of the manufacturing method of the stator described above can be obtained by using the coil mounting means and the welding means. Furthermore, the device such as a jig used as an accessory to the coil mounting means and the welding means can be combined by using the coil mounting means and the welding means in the same step for manufacturing the stator.

DESCRIPTION

Figure 1:
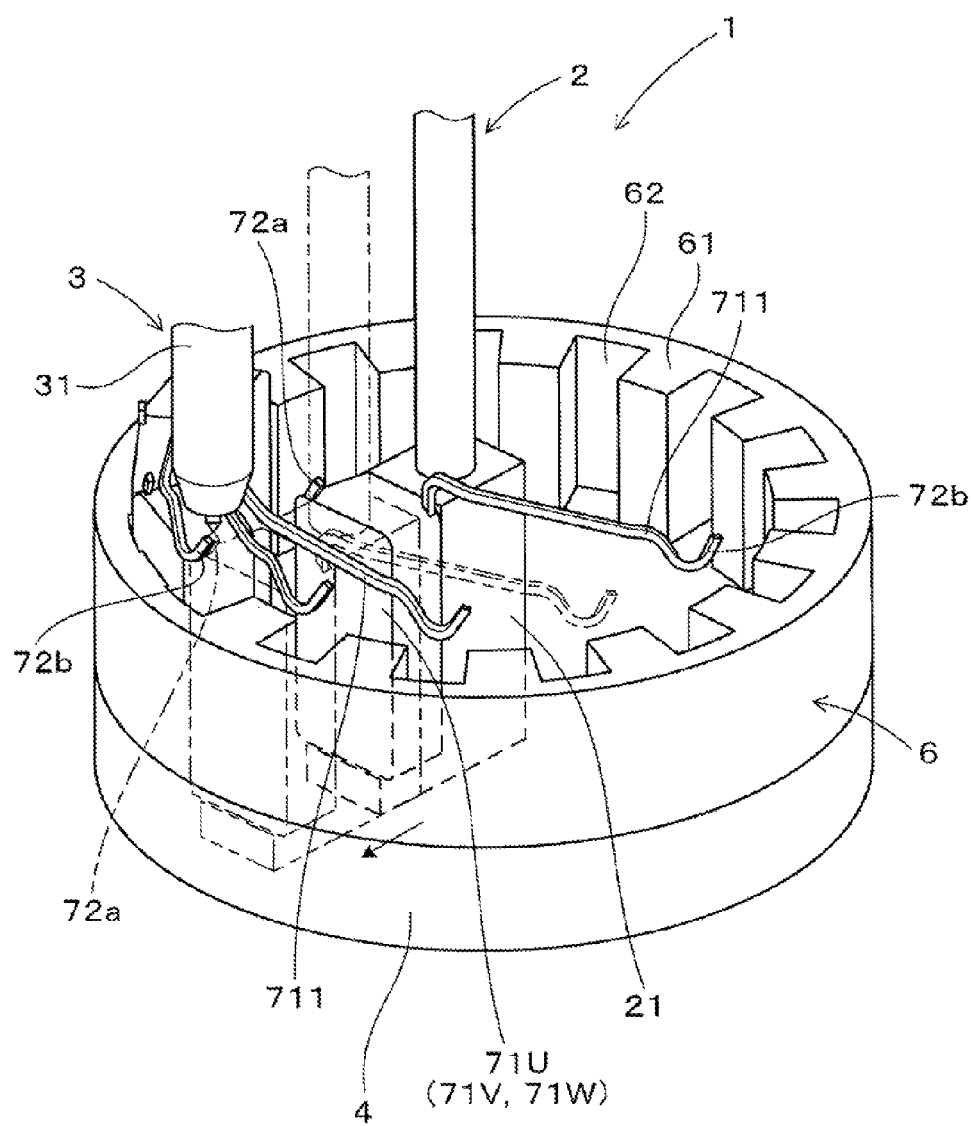
FIG. 1 is a perspective explanatory view showing a stator manufacturing device according to a first embodiment.

Preferred embodiments of a manufacturing method and a manufacturing device of a stator described above will be described below.

In the manufacturing method and the manufacturing device of the stator described above, the square wire conductor is a conductor having a cross-section of a substantially rectangular shape, a flat shape, and the like. The concentrated winding coil may be formed by winding one square wire conductor.

The welding of each end of the first set of concentrated winding coils and corresponding end of the second set of concentrated winding coils may be completed or may not be completed within a time for mounting the third set of concentrated winding coils on the teeth. In other words, the time for mounting the third set of concentrated winding coils on the teeth and the time for welding each end of the first set of concentrated winding coils and the corresponding end of the second set of concentrated winding coils may overlap.

In the manufacturing method of the stator, the welding of the ends of the concentrated winding coils may be repeatedly carried out each time the concentrated winding coils are mounted on the teeth.

In this case, the welding of the ends of the concentrated winding coils and the mounting of the concentrated winding coils on the teeth can be repeatedly carried out within the same period of time. Thus, the time for manufacturing the stator can be easily reduced.

The stator is a stator for a three-phase rotary electric machine in which the concentrated winding coils are divided into three phases of the U, V and W phases, and the concentrated winding coils formed in three phases are repeatedly mounted on the teeth adjacently in a circumferential direction of the stator core in the same arrangement order. The stator core may be sequentially rotated in the circumferential direction by a predetermined rotation angle to mount the concentrated winding coils formed in three phases on the teeth in the same arrangement order and sequentially weld the mounted concentrated winding coils in the circumferential direction.

In this case, the device for manufacturing the stator can be simplified.

The first set of concentrated winding coils and the second set of concentrated winding coils may be concentrated winding coils in the same phase, and the third set of concentrated winding coils may be concentrated winding coils in a phase different from the first and second sets of concentrated winding coils.

In this case, the concentrated winding coils in the same phase can be welded to each other while the concentrated winding coils in another phase are mounted on the teeth. Thus, the mounting and the welding of each of the concentrated winding coils in one phase can be efficiently carried out while preventing the interference between the device used to mount each of the concentrated winding coils in one phase or the concentrated winding coils mounted to such device, and the device used to weld each of the concentrated winding coils in one phase.

The second set of concentrated winding coils may be mounted on the teeth immediately before the third set of concentrated winding coils is mounted on the teeth.

In this case, the time for manufacturing the stator can be reduced as much as possible.

In at least two or more of the plurality of concentrated winding coils in different phases, one of the winding ends of the square wire conductor may form an extending portion extending axially outward of the stator core at either one of the inner circumferential position and the outer circumferential position, and the other winding end of the square wire conductor may form a connecting portion extending axially outward of the stator core and then extending to an extending portion of another coil in the same phase at the other one of the inner circumferential position and the outer circumferential position.

In this case, the extending portion of the concentrated winding coil and the connecting portion of the other concentrated winding coil in the same phase can be welded and connected to each other.

In link coils formed in three phases which consist of the concentrated winding coils connected in their respective phases, at end in each of the concentrated winding coils in one phase which is located at the first edge, a lead conductor is welded to the end in each of the concentrated winding coils in one phase to form lead portions in three phases, and at end in each of the concentrated winding coils in one phase which is located at the second edge, the end in each of the concentrated winding coils in one phase is welded to each other to form a neutral point.

In this case, not only the mounting of the coils to the stator core and the welding of the ends of the coils are carried out in the same step for manufacturing the stator but the welding of the lead conductors in three phases and the welding of the neutral point can also be carried out. Thus, the stator can be manufactured in a shorter time and with fewer devices.

The manufacturing device of the stator includes a rotating means for rotating the stator core about a central axis line thereof, in which the coil mounting means and the welding means may be configured to carry out the mounting of the concentrated winding coils and the welding of the ends of the concentrated winding coils with the concentrated winding coils being spaced apart from each other by a predetermined distance in the circumferential direction of the stator core.

In this case, the stator can be manufactured while rotating the stator core, avoiding the interference of the coil mounting means and the welding means.

In the manufacturing device of the stator, the ends of the concentrated winding coils may be repeatedly welded by the welding means each time the concentrated winding coils are mounted on the teeth by the coil mounting means.

In this case, the welding of the ends of the concentrated winding coils and the mounting of the concentrated winding coils on the teeth can be repeatedly carried out in the same period of time. Thus, the time for manufacturing the stator can be easily reduced.

[Embodiments]

Embodiments related to a manufacturing method and a manufacturing device of a stator will be hereinafter described with reference to the drawings.

As shown in FIG. 1, in the manufacturing method of a stator 5 of the present embodiment, concentrated winding coils 71U, 71V, 71W formed in three phases wound with a square wire conductor 711 are mounted on a plurality of teeth 61 in a stator core 6, and end 72a in each of the concentrated winding coils 71U, 71V, 71W in one phase is welded to corresponding end 72b in other concentrated winding coils 71U, 71V, 71W in the same phase to manufacture the stator 5. When manufacturing the stator 5, a first set of concentrated winding coils and a second set of concentrated winding coils are mounted on the teeth 61. Then, the welding of each end 72a in the first set of concentrated winding coils and the corresponding end 72b in the second set of concentrated winding coils is started when the third set of concentrated winding coils in a phase different from the first and second sets of concentrated winding coils is mounted on the teeth 61. The second set of concentrated winding coils is mounted on the teeth 61 immediately before the third set of concentrated winding coils is mounted on the teeth 61.

The manufacturing method and the manufacturing device 1 of the stator 5 according to the present embodiment will be described below in detail with reference to FIGS. 1 to 6.

(First Embodiment)

Figure 2:
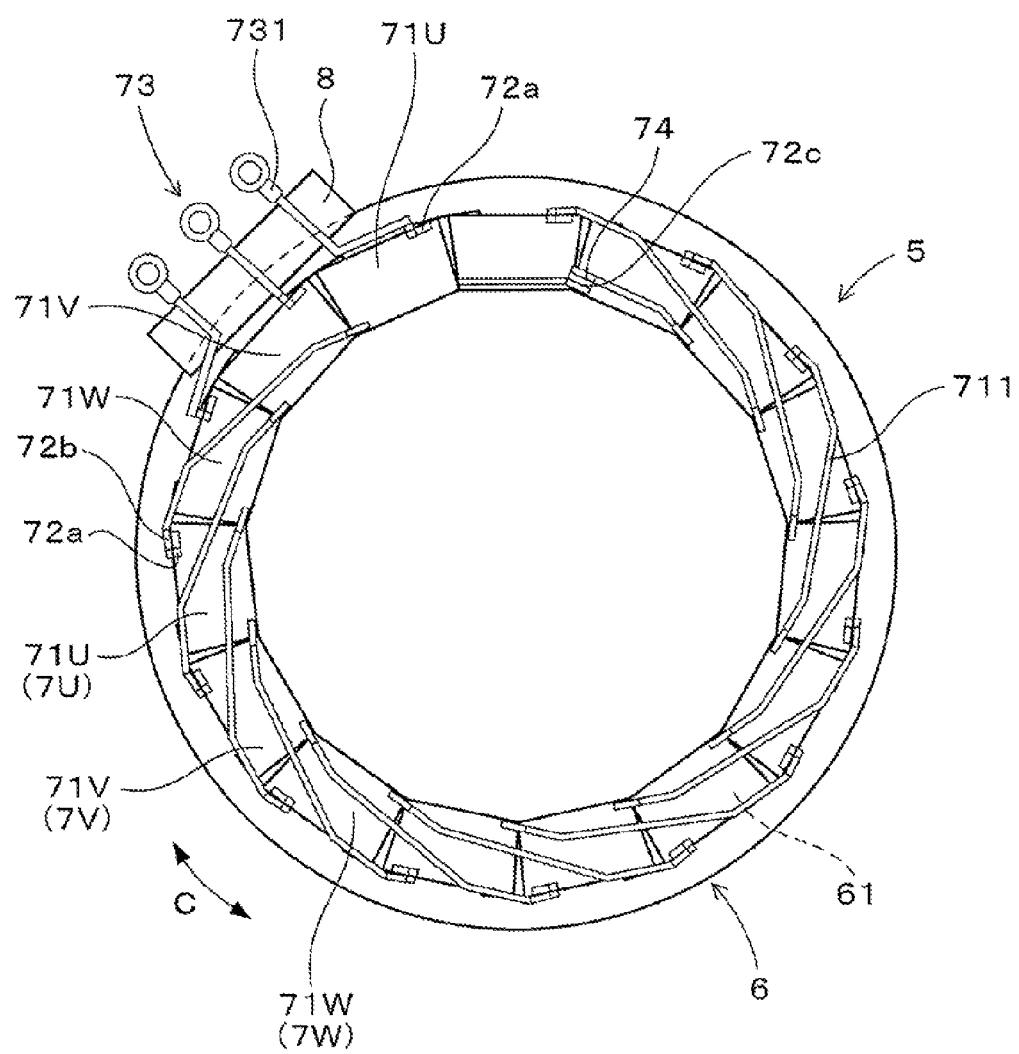
FIG. 2 is a plan explanatory view showing a stator according to the first embodiment.

As shown in FIG. 2, the stator 5 according to the present embodiment is the stator 5 for a three-phase rotary electric machine in which the concentrated winding coils 71U, 71V, 71W are divided into the U, V and W phases of the link coils 7U, 7V, 7W formed in three phases. The stator core 6 radially includes slots 62 and the teeth 61 on the inner circumferential side, and is disposed on the outer circumferential side of an inner rotor. The concentrated winding coils 71U, 71V, 71W are formed by winding the square wire conductor (rectangular wire) 711 having a cross-section of a substantially rectangular shape, flat shape, and the like to a shape that lies along the outer periphery of the teeth 61. The square wire conductor 711 is formed of a conductor layer made from a copper material, and an insulating layer made from an insulating resin that covers the outer periphery of the conductor layer. Each of the concentrated winding coils 71U, 71V, 71W in one phase is formed by winding one square wire conductor 711.

In the stator 5, the same number of the concentrated winding coils 71U, 71V, 71W formed in three phases is repeatedly mounted on the teeth 61 adjacently in a circumferential direction C of the stator core 6 in the same arrangement order. The ends 72a, 72b in the concentrated winding coils 71U (or 71V, 71W) formed in the same phase are joined together by welding at end on one axial end side of the stator core 6. The link coils 7U, 7V, 7W formed in three phases which consist of the concentrated winding coils 71U, 71V, 71W connected in their respective phases, are disposed in the stator core 6. The link coils 7U, 7V, 7W formed in three phases are star connected. Lead portions 73 in three phases are formed at the first edges of the link coils 7U, 7V, 7W formed in three phases, and a neutral point 74 is formed at the second edge of the link coils 7U, 7V, 7W formed in three phases.

At the end 72a in each of the concentrated winding coils 71U, 71V, 71W in one phase which is located at the first edge of each of the link coils 7U, 7V, 7W formed in three phases, a lead conductor 731 is welded to the end 72a in each of the concentrated winding coils 71U, 71V, 71W in one phase to form the lead portions 73 in three phases. At the end 72c in each of the concentrated winding coils 71 U, 71 V, 71W in one phase which is located at the second edge of each of the link coils 7U, 7V, 7W formed in three phases, the end 72c in each of the concentrated winding coils 71U, 7V, 7W in one phase is welded to each other to form a neutral point 74.

As shown in FIG. 2, the lead portions 73 in three phases are disposed with respect to a terminal block 8 attached to an axial end face of the stator core 6. The lead conductors 731 in three phases are attached in advance to the terminal block 8. The lead conductor 731 on the terminal block 8 and the end 72a in each of the concentrated winding coils 71U, 71V, 71W in one phase are welded to form the lead portions 73 in three phases.

Figure 7:
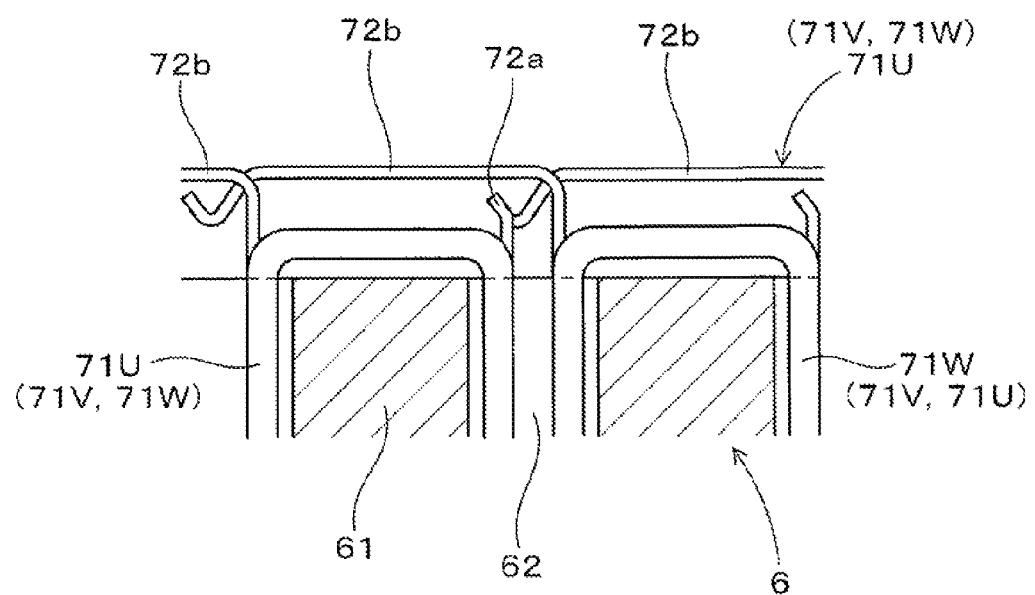
FIG. 7 is an explanatory view showing concentrated winding coils to be mounted on slots of a stator core viewed from the inner circumferential side of the stator core according to the first embodiment.

As shown in FIG. 7, each of the concentrated winding coils 71U, 71V, 71W in one phase includes one end 72a extended to the position on the outer circumferential side of the stator core 6, and the other end 72b extended from the position on the inner circumferential side of the stator core 6 to the position on the outer circumferential side while passing through the externally outward side of the concentrated winding coils 71U, 71V, 71W in another phase. In each of the concentrated winding coils 71U, 71V, 71W in one phase, the end 72c that forms the neutral point 74 is extended to the position on the inner circumferential side of the stator core 6.

The one end 72a extended to the position on the outer circumferential side includes one winding end of the square wire conductor 711. The one end 72a forms an extending portion extended to the axially outward side of the stator core 6. The other end 72b extended from the position on the inner circumferential side to the position on the outer circumferential side of the stator core 6 includes the other winding end of the square wire conductor 711. The other end 72b forms a connecting portion extended to the axially outward side of the stator core 6, and then stretched to the one end 72a of another coil 71U, 71V, 71W in the same phase.

The one end 72a serving as the extending portion and the other end 72b serving as the connecting portion are formed at portions other than the end 72c that forms the neutral point 74.

As shown in FIG. 1, when manufacturing the stator 5 of the present embodiment, the stator manufacturing device 1 including a coil mounting means 2, a welding means 3, and a rotating means 4 is used.

The coil mounting means 2 is configured to sequentially mount the concentrated winding coils 71U, 71V, 71W wound with the square wire conductor 711 on the plurality of teeth 61 in the stator core 6. The coil mounting means 2 includes a holding portion 21 that holds the concentrated winding coils 71U, 71V, 71W. The holding portion 21 of the coil mounting means 2 is configured to sequentially face each of the teeth 61 in the stator core 6 and move forward with respect to the teeth 61 to mount the concentrated winding coils 71U, 71V, 71W held by the holding portion 21 on the teeth 61.

The welding means 3 includes a welding torch 31 that carries out TIG welding (tungsten—inactive gas welding). The welding torch 31 can be moved to welding areas where the ends 72a, 72b of the concentrated winding coils 71U, 71V, 71W are located by being attached to a robot (moving device).

The coil mounting means 2 and the welding means 3 are configured to carry out the mounting of the concentrated winding coils 71U, 71V, 71W and the welding of the ends 72a, 72b of the concentrated winding coils 71U, 71V, 71W while the coil mounting means 2 and the welding means 3 are separated by a predetermined distance in the circumferential direction C of the stator core 6.

The stator core 6 is held by the rotating means 4. The rotating means 4 is configured to hold the stator core 6, and rotate the stator core 6 about a central axis line thereof by an angle corresponding to a formed interval between the teeth 61 in the circumferential direction C. The rotating means 4 may be configured to rotate the coil mounting means 2 as well as being configured to rotate the stator core 6. The welding torch 31 may be fixed at an appropriate area.

The stator manufacturing device 1 may include a monitoring camera that monitors whether the area welded by the welding means 3 is normally welded. The monitoring camera can carry out image processing to check whether the welded state is good or bad. In this case, the monitoring camera can determine, for each area where the welding means 3 carries out the welding, whether the state of each welding area is good or bad while the concentrated winding coils 71U, 71V, 71W are mounted on the teeth 61 or the ends 72a, 72b of the concentrated winding coils 71U, 71V, 71W are welded to each other.

Next, a method for manufacturing the stator 5 using the stator manufacturing device 1 and the operation effects thereof will be described.

In the present embodiment, the welding of the ends 72a, 72b of the concentrated winding coils 71U, 71V, 71W formed in three phases is repeatedly carried out every time the concentrated winding coils 71U, 71V, 71W are mounted on the teeth 61. The stator core 6 is sequentially rotated in the circumferential direction C by a predetermined rotation angle to mount the concentrated winding coils 71U, 71V, 71W formed in three phases on the teeth 61 in the same arrangement order and to sequentially weld the mounted concentrated winding coils 71U, 71V, 71W in the circumferential direction C.

Figure 3:
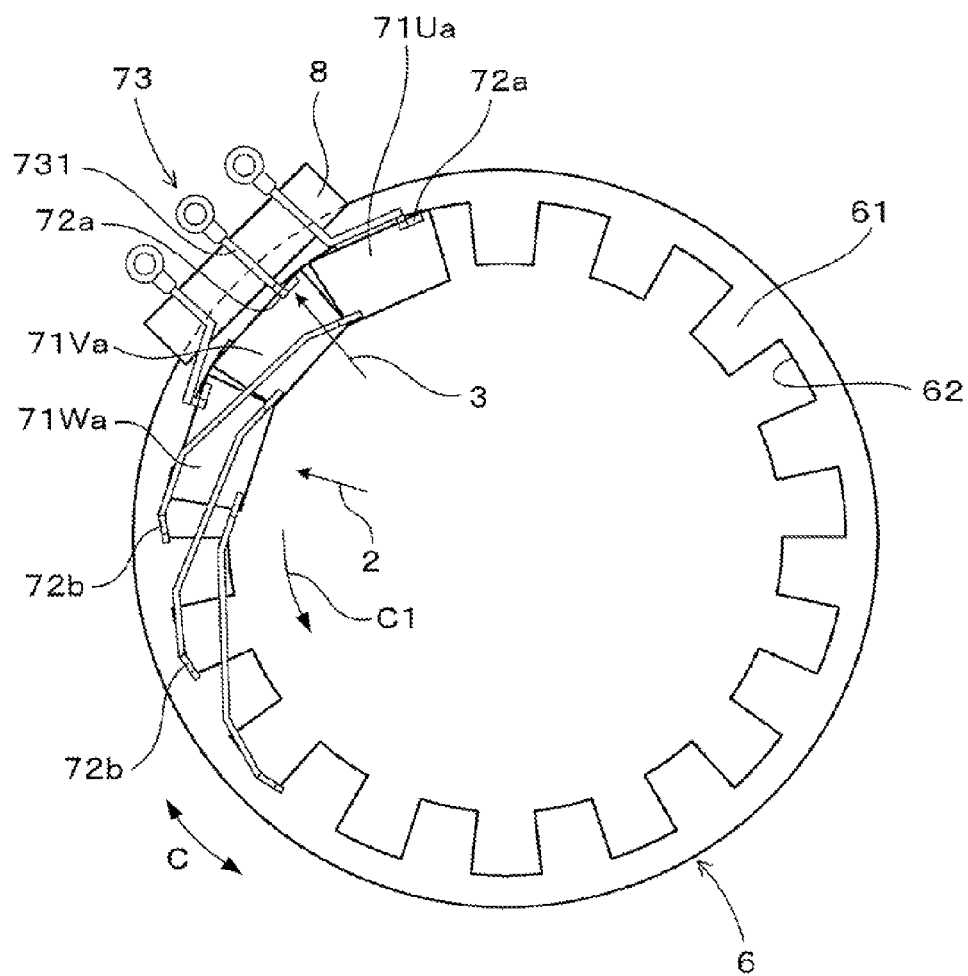
FIG. 3 is a plan explanatory view showing a state of manufacturing the stator according to the first embodiment.

As shown in FIG. 3, the terminal block 8 including the lead conductors 731 in three phases is attached to the axial end face of the stator core 6. The U, V, and W phases of the concentrated winding coils 71U, 71V, 71W formed in three phases are then mounted on the teeth 61 of the stator core 6 by the coil mounting means 2. The concentrated winding coils 71U, 71V, 71W are located at the first edge of each of the link coils 7U, 7V, 7W in one phase to form the lead portions 73.

After the concentrated winding coil 71Ua in U phase located at the first edge of the link coil 7U in U phase is mounted on the tooth 61 by the coil mounting means 2, the lead conductor 731 on the terminal block 8 and one end 72a of the concentrated winding coil 71Ua in U phase can be welded by the welding means 3 while the concentrated winding coil 71Va in V phase located at the first edge of the link coil 7V in V phase is mounted on the tooth 61 to form the lead portion 73 in U phase (see FIG. 2). Similarly, the lead portion 73 in V phase can be formed when the concentrated winding coil 71Wa in W phase is mounted on the tooth 61 (see FIG. 2). Hereinafter, the first edge means one edge of each of the link coils 7U, 7V, 7W.

Figure 4:
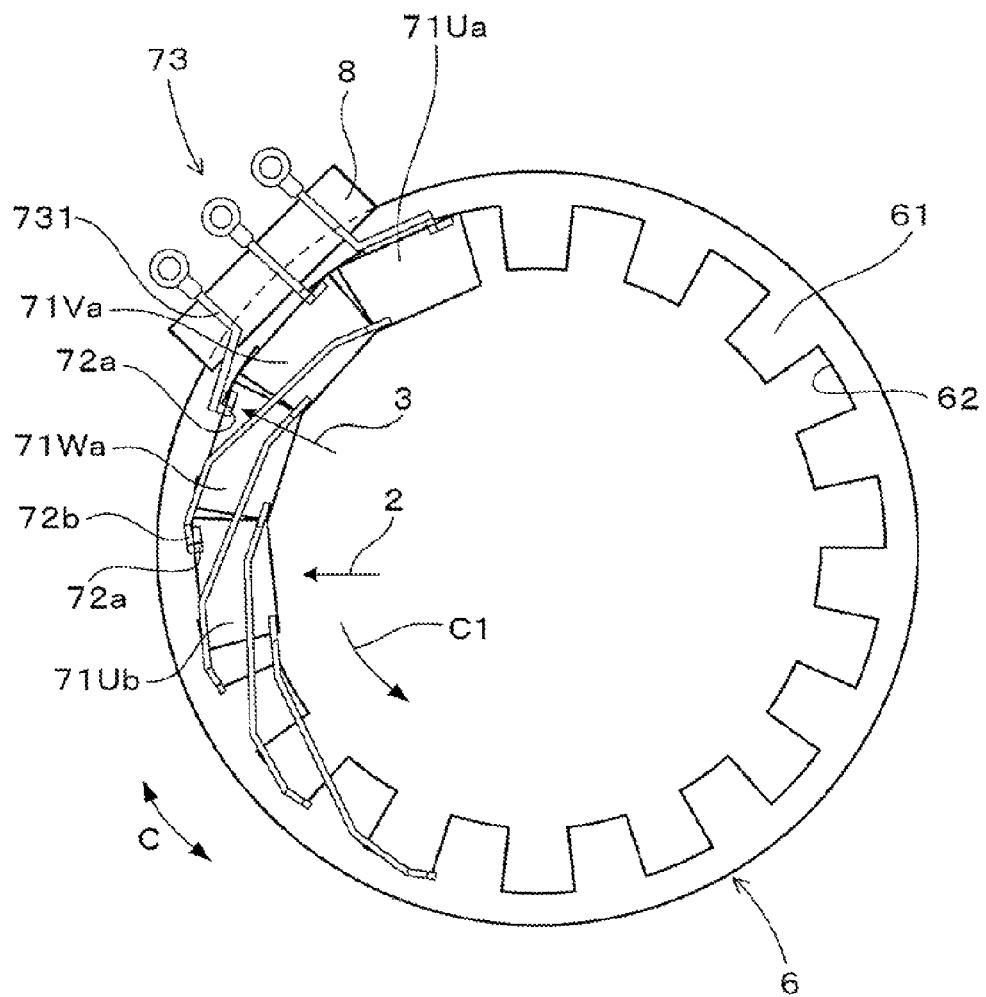
FIG. 4 is a plan explanatory view showing the state of manufacturing the stator according to the first embodiment.

Then, as shown in FIG. 4, the concentrated winding coil 71Ub in U phase located at the second position from the first edge is mounted on a slot 62 by the coil mounting means 2. In this case, one end 72a of the concentrated winding coil 71Ub in U phase located at the second position from the first edge and the other end 72b of the concentrated winding coil 71Ua in U phase located at the first edge face each other. The lead conductor 731 on the terminal block 8 and one end 72a of the concentrated winding coil 71Wa in W phase located at the first edge can be welded by the welding means 3 while the concentrated winding coil 71Ub in U phase is mounted to form the lead portion 73 in W phase (see FIG. 2).

Figure 5:
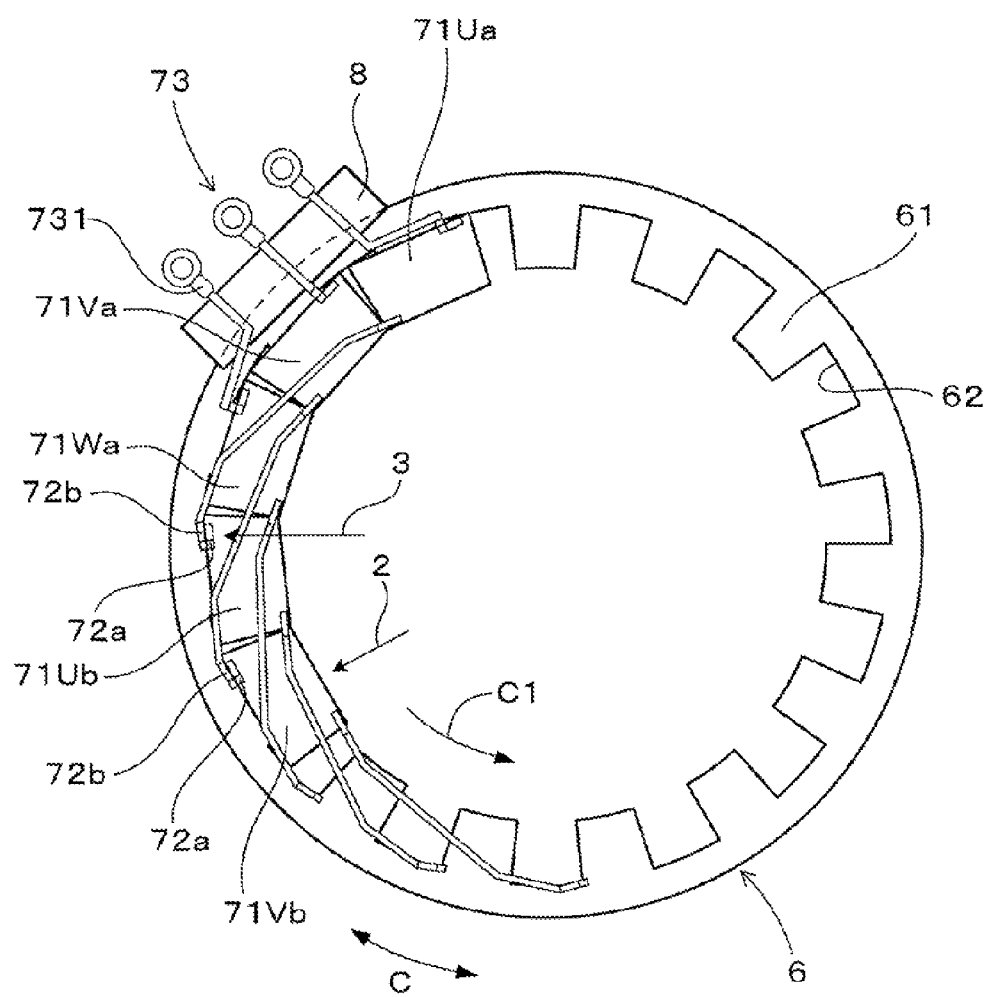
FIG. 5 is a plan explanatory view showing the state of manufacturing the stator according to the first embodiment.

Next, as shown in FIG. 5, the concentrated winding coil 71Vb in V phase (third set of concentrated winding coils) located at the second position from the first edge is mounted on the slot 62 by the coil mounting means 2. In this case, one end 72a of the concentrated winding coil 71Vb in V phase (third set of concentrated winding coils) located at the second position from the first edge and the other end 72b of the concentrated winding coil 71Va in V phase located at the first edge face each other. The one end 72a of the concentrated winding coil 71Ub in U phase (second set of concentrated winding coils) located at the second position from the first edge and the other end 72b of the concentrated winding coil 71Ua in U phase (first set of concentrated winding coils) located at the first edge can be welded by the welding means 3 while the concentrated winding coil 71Vb in V phase (third set of concentrated winding coils) is mounted.

Figure 6:
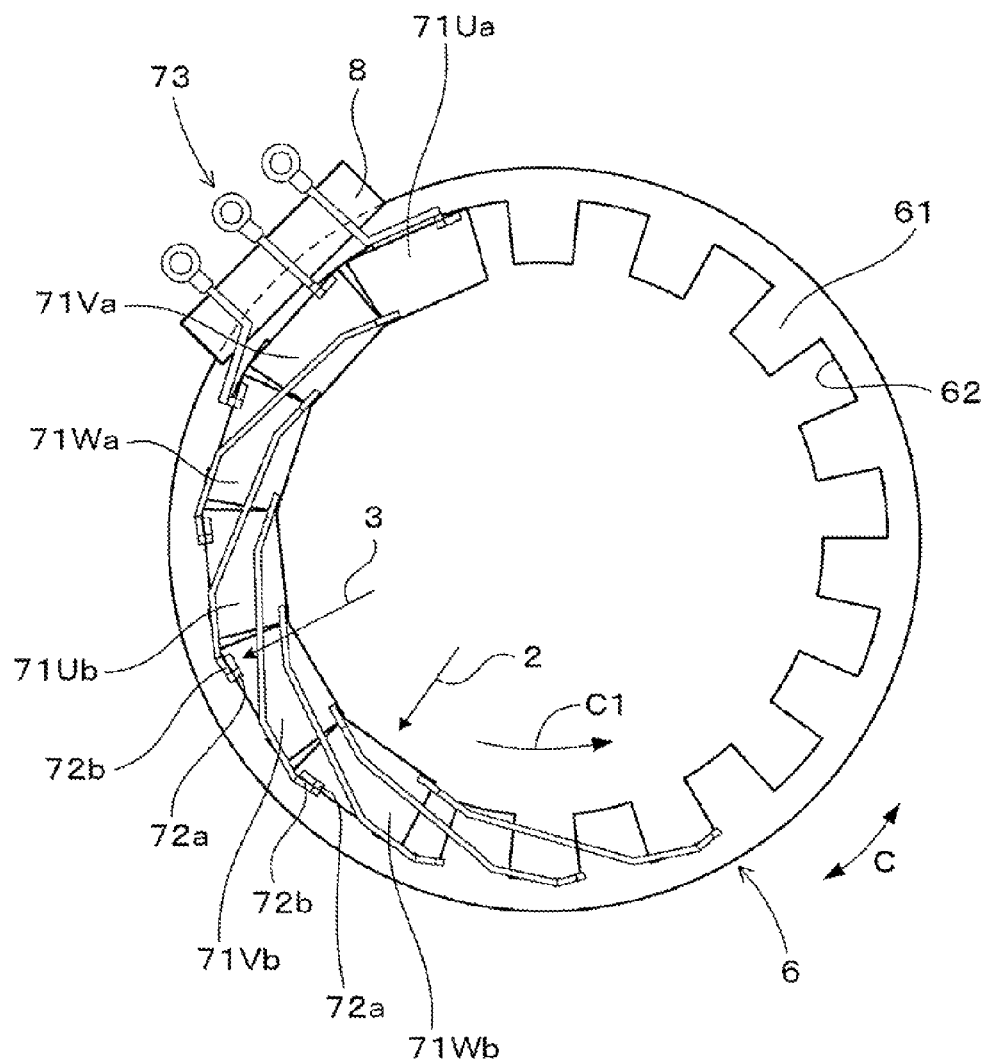
FIG. 6 is a plan explanatory view showing the state of manufacturing the stator according to the first embodiment.

Then, as shown in FIG. 6, the concentrated winding coil 71Wb in W phase (third set of concentrated winding coils) located at the second position from the first edge is mounted on the slot 62 by the coil mounting means 2. In this case, one end 72a of the concentrated winding coil 71Wb in W phase (third set of concentrated winding coils) located at the second position from the first edge and the other end 72b of the concentrated winding coil 71Wa in W phase located at the first edge face each other. The one end 72a of the concentrated winding coil 71Vb in V phase (second set of concentrated winding coils) located at the second position from the first edge and the other end 72b of the concentrated winding coil 71Va in V phase (first set of concentrated winding coils) located at the first edge can be welded by the welding means 3 while the concentrated winding coil 71Wb in W phase (third set of concentrated winding coils) is mounted.

Similarly thereafter, the ends 72a, 72b of each of the mounted concentrated winding coils 71U, 71V, 71W in one phase can be welded by the welding means 3 utilizing the time for mounting each of the concentrated winding coils 71U, 71V, 71W in one phase.

After all the concentrated winding coils 71U, 71V, 71W formed in three phases are mounted, the end 72c of each of the concentrated winding coils 71U, 71V, 71W in one phase which is located at the second edge of each of the link coils 7U, 7V, 7W formed in three phases can be welded to each other by the welding means 3 to form the neutral point 74 (see FIG. 2). The lead portion 73 in each phase can also be formed by the welding means 3 when forming the neutral point 74.

In the present embodiment, each of the concentrated winding coils 71U, 71V, 71W in one phase is sequentially mounted on the slot 62 of the stator core 6 in the same arrangement order in one direction C1 from the side where the one end 72a is located to the side where the other end 72b is located in the circumferential direction C of the stator core 6.

As shown in FIG. 7, when the concentrated winding coil 71U (or 71V, 71W) in one phase is mounted on the slot 62, the one end 72a serving as the extending portion of the concentrated winding coil 71U (or 71V, 71W) is caused to pass through the axially inward side with respect to the other end 72b serving as the connecting portion of the concentrated winding coils 71V, 71W (or 71U, 71W, or 71U, 71V) formed in other two phases mounted earlier on the slots 62. Thus, the position where the other end 72b is extended to the axially outward side of the stator core 6 is located on the axially outward side of the position where the one end 72a is extended to the axially outward side of the stator core 6.

In the present embodiment, the mounting and the welding of the concentrated winding coils 71U, 71V, 71W can be carried out in the same step for manufacturing the stator 5 by using the stator manufacturing device 1. The coil mounting means 2 and the welding means 3 are used in the same step for manufacturing the stator 5, so that devices such as jigs and the like used as an accessory to the means 2, 3 can be combined. The number of the devices used for manufacturing the stator 5 thus can be reduced. Furthermore, the space occupied by the devices used for manufacturing the stator 5 in the manufacturing step of the stator 5 can be also reduced.

(Second Embodiment)

Figure 8:
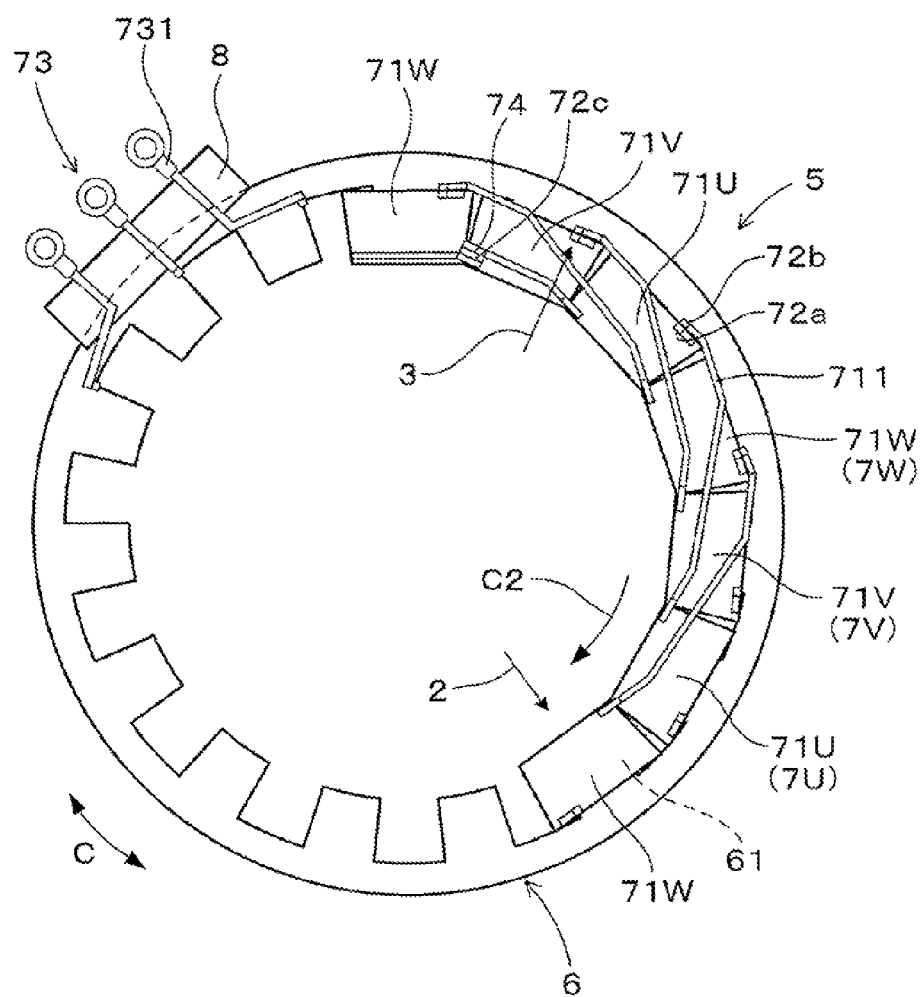
FIG. 8 is a plan explanatory view showing a state of manufacturing a stator according to a second embodiment.

As shown in FIG. 8, the present embodiment is an example in which each of the concentrated winding coils 71U, 71V, 71W in one phase is sequentially mounted in the same arrangement order in the other direction C2, which is opposite from the one direction C1 of the stator core 6 shown in the first embodiment. Each of the concentrated winding coils 71U, 71V, 71W of the present embodiment is sequentially mounted on the slot 62 of the stator core 6 so as to be disposed from the side where the other end 72b is located to the side where the one end 72a is located in the circumferential direction C of the stator core 6.

The concentrated winding coils 71U, 71V, 71W of the present embodiment are mounted on the slots 62 such that the other end 72b serving as the connecting portion is caused to pass through between the one end 72a serving as the extending portion and the other end 72b serving as the connecting portion of the concentrated winding coils 71U, 71V, 71W already mounted on the slots 62 of the stator core 6. The one end 72a of the concentrated winding coils 71U (or 71V, 71W) does not need to be passed through the axially inward side with respect to the other ends 72b of the concentrated winding coils 71V, 71W (or 71U, 71W, or 71U, 71V) in the other two phases which are mounted earlier on the slots 62. Thus, the position where the one end 72a and the other end 72b are extended toward the axially outward side of the stator core 6 can be brought as close as possible to the axial end face of the stator core 6, and the protruding amount of the coil end portion protruding from the axial end face of the stator core 6 can be made as small as possible.

In the present embodiment, the mounting position by the coil mounting means 2 and the welding position by the welding means 3 are spaced apart as much as possible to easily avoid the interference of the coil mounting means 2 or the concentrated winding coils 71U, 71V, 71W mounted on the coil mounting means 2, and the welding means 3. The welding using the welding means 3 is started after the U, V and W phases of the concentrated winding coils 71U, 71V, 71W are mounted on the slots 62 repeatedly two times toward the other direction C2 of the stator core 6 using the coil mounting means 2.

Figure 9:
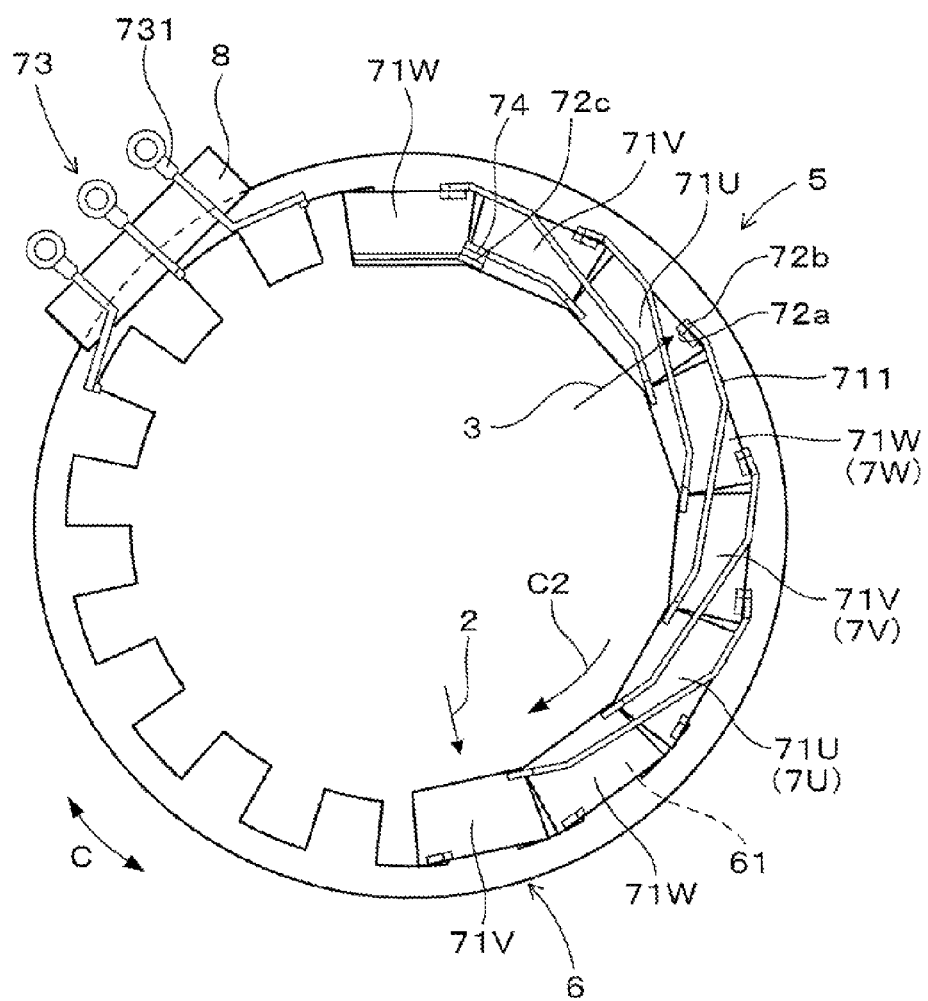
FIG. 9 is a plan explanatory view showing the state of manufacturing the stator according to the second embodiment.

FIG. 8 shows a state of welding one end 72a of the concentrated winding coil 71V in V phase located at the first edge of the link coil 7V in V phase and the other end 72b of the concentrated winding coil 71V in V phase located at the second position from the first edge of the link coil 7V in V phase while the concentrated winding coil 71W in W phase located at the third position from the first edge of the link coil 7W in W phase is mounted on the slot 62. FIG. 9 shows a state in which one end 72a of the concentrated winding coil 71U in U phase located at the first edge of the link coil 7U in U phase and the other end 72b of the concentrated winding coil 71U in U phase located at the second position from the first edge of the link coil 7U in U phase are welded to each other while the concentrated winding coil 71V in V phase located at the third position from the first edge of the link coil 7V in V phase is mounted on the slot 62.

Similarly for the other concentrated winding coils 71U, 71V, 71W, the mounting and the welding are sequentially carried out in the other direction C2 of the stator core 6.

In the present embodiment as well, other configurations and reference numerals in the figures are similar to those in the first embodiment, and similar operation effects to the effects of the first embodiment can be obtained.

The invention claimed is:

1. A manufacturing method of a stator comprising:
    mounting a concentrated winding coil wound with a square wire conductor on each of a plurality of teeth in a stator core and welding end of the concentrated winding coil to corresponding end of another concentrated winding coil, wherein
    a first concentrated winding coil and a second concentrated winding coil are mounted on the teeth, and the welding of each end in the first concentrated winding coil and corresponding end in the second concentrated winding coil is started while a third concentrated winding coil is mounted on the teeth, and
    the welding of the ends of the concentrated winding coils is repeatedly carried out each time the concentrated winding coils are mounted on the teeth.

2. The manufacturing method of a stator according to claim 1, wherein
    the stator is a stator for a three-phase rotary electric machine in which the concentrated winding coils are divided into three phases of U, V, and W phases, and the concentrated winding coils formed in three phases are repeatedly mounted on the teeth adjacently in a circumferential direction of the stator core in the same arrangement order; and
    the stator core is sequentially rotated in the circumferential direction by a predetermined rotation angle to mount the concentrated winding coils formed in three phases on the teeth in the same arrangement order and sequentially weld the mounted concentrated winding coils in the circumferential direction.

3. The manufacturing method of a stator according to claim 2, wherein
    the second concentrated winding coil is mounted on the teeth immediately before the third concentrated winding coil is mounted on the teeth.

4. The manufacturing method of a stator according to claim 3, wherein
    in link coils formed in three phases which consist of the concentrated winding coils connected in their respective phases, at end in each of the concentrated winding coils in one phase which is located at a first edge, a lead conductor is welded to the end in each of the concentrated winding coils in one phase to form lead portions in three phases, and at end in each of the concentrated winding coils in one phase which is located at a second edge, the end in each of the concentrated winding coils in one phase is welded to each other to form a neutral point.

5. The manufacturing method of a stator according to claim 2, wherein
    in link coils formed in three phases which consist of the concentrated winding coils connected in their respective phases, at end in each of the concentrated winding coils in one phase which is located at a first edge, a lead conductor is welded to the end in each of the concentrated winding coils in one phase to form lead portions in three phases, and at end in each of the concentrated winding coils in one phase which is located at a second edge, the end in each of the concentrated winding coils in one phase is welded to each other to form a neutral point.

6. The manufacturing method of a stator according to claim 1, wherein
    the second concentrated winding coil is mounted on the teeth immediately before the third concentrated winding coil is mounted on the teeth.

7. The manufacturing method of a stator according to claim 6, wherein
    in link coils formed in three phases which consist of the concentrated winding coils connected in their respective phases, at end in each of the concentrated winding coils in one phase which is located at a first edge, a lead conductor is welded to the end in each of the concentrated winding coils in one phase to form lead portions in three phases, and at end in each of the concentrated winding coils in one phase which is located at a second edge, the end in each of the concentrated winding coils in one phase is welded to each other to form a neutral point.

8. A manufacturing method of a stator having a stator core configured with a plurality teeth, each of the plurality of teeth having a concentrated winding coil wound with a square wire conductor mounted thereon, the method comprising:
mounting a first concentrated winding coil on a first one of the plurality of teeth;
mounting a second concentrated winding coil on a second one of the plurality of teeth;
welding an end of the first concentrated winding coil to a corresponding end of the second concentrated winding coil;
mounting a third concentrated winding coil on a third one of the plurality of teeth at the same time that the welding step is being performed;
repeatedly performing simultaneous welding and mounting of subsequent winding coils until concentrated winding coils are mounted on all of the plurality of teeth.

* * * * *